Figure 4:
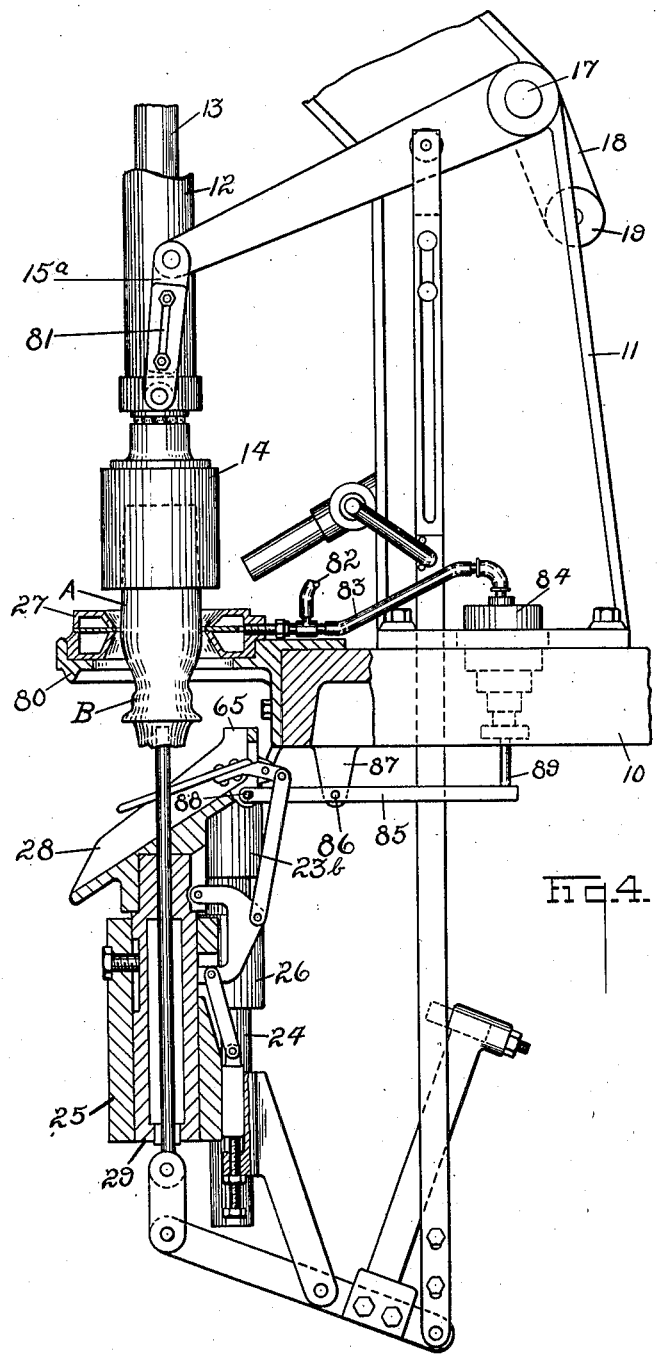

March 23, 1926.
A. C. PARKER
1,577,537
APPARATUS FOR BURNING-OFF GLASS
Filed April 7, 1924    4 Sheets-Sheet 1
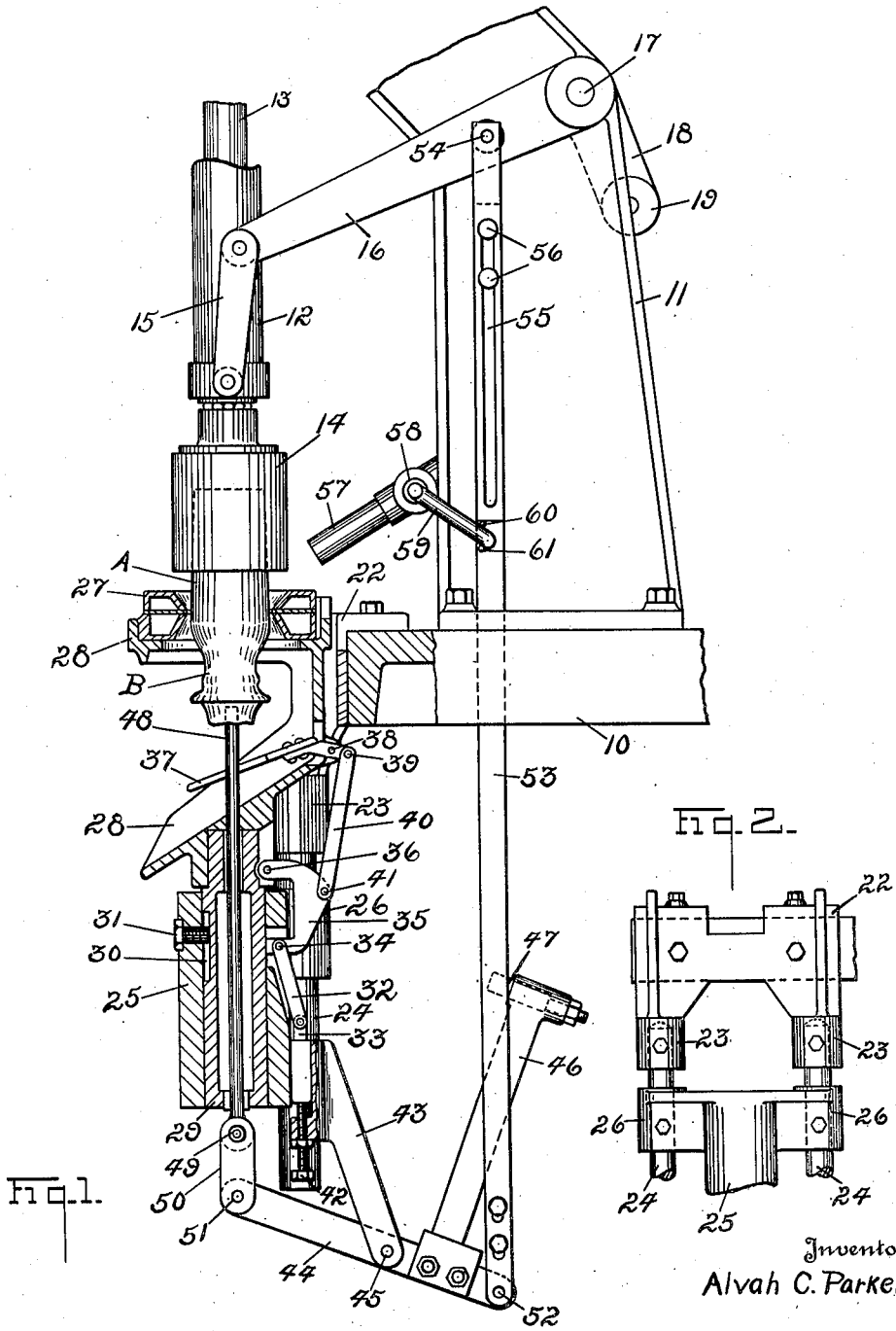
Inventor
Alvah C. Parker.

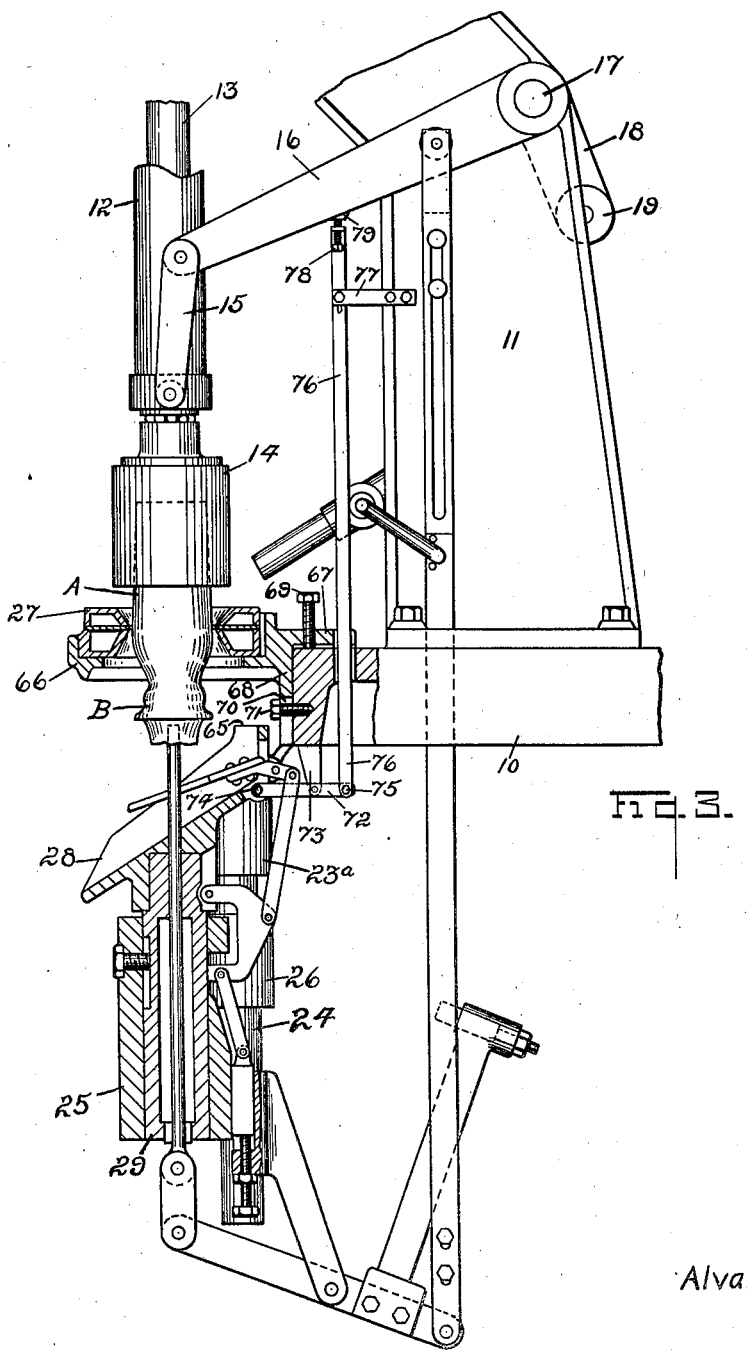

March 23, 1926. 1,577,537
A. C. PARKER
APPARATUS FOR BURNING-OFF GLASS
Filed April 7, 1924 4 Sheets-Sheet 3

Inventor
Alvah C. Parker.
By Owen, Owen & Crampton
Attorney

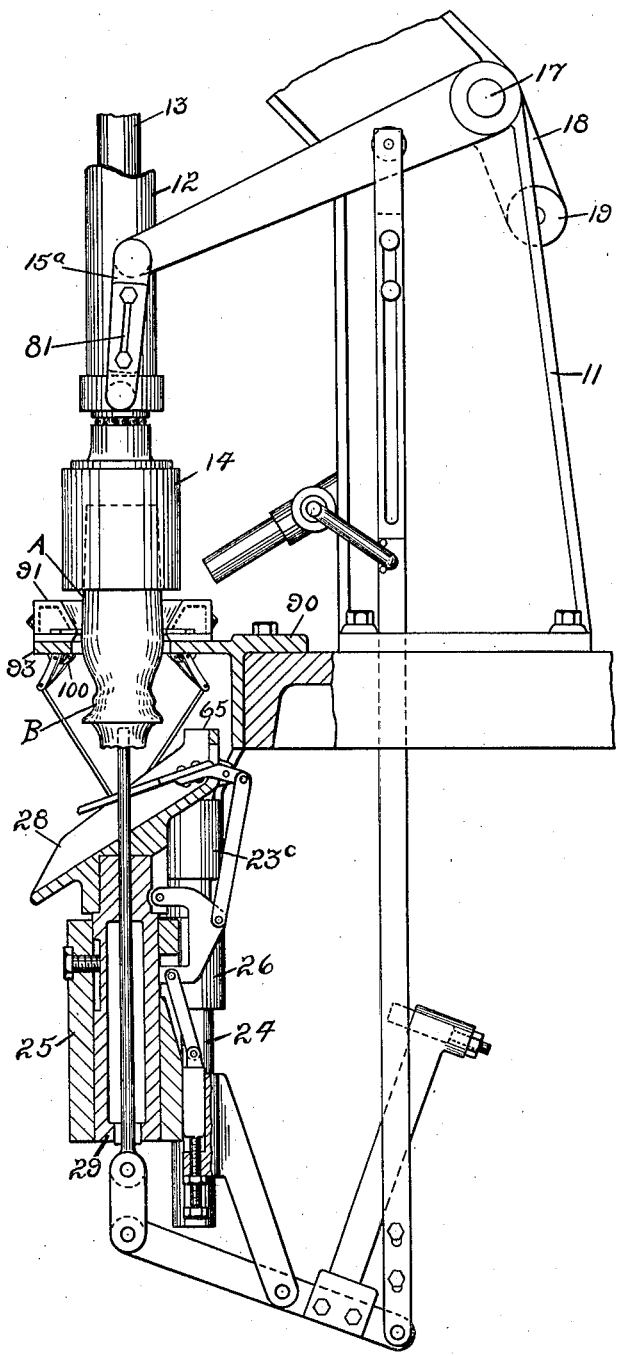

Patented Mar. 23, 1926.

1,577,537

UNITED STATES PATENT OFFICE.

ALVAH C. PARKER, OF TOLEDO, OHIO, ASSIGNOR TO THE LIBBEY GLASS MANUFACTURING COMPANY, A CORPORATION OF OHIO.

APPARATUS FOR BURNING OFF GLASS.

Application filed April 7, 1924. Serial No. 704,579.

*To all whom it may concern:*

Be it known that I, ALVAH C. PARKER, a citizen of the United States, and a resident of Toledo, in the county of Lucas and State of Ohio, have invented a new and useful Apparatus for Burning Off Glass, which invention is fully set forth in the following specification.

My invention relates to apparatus for burning-off glass and has for its object to provide apparatus which will burn-off and fire-finish the severed edge. More specifically it has for its object to provide apparatus so constructed that the fire-finishing will be automatically initiated upon the completion of severance.

When glass is severed by melting the glass along the desired line of severance until the glass parts along that line, the molten glass at the line of parting tends to string out and, in order to leave a smooth edge, a fire-finishing step, to smooth out any irregularities caused by this stringing action is desirable. It is frequently desirable also to continue a milder heat for a time after severance, in order to properly dispose the molten glass along the severed edge and form a bead of the desired shape.

Other minor objects of my invention and the manner in which I achieve my objects will appear as the description proceeds.

In the accompanying drawings, Figure 1 is a partial side view of my apparatus with portions broken away. Fig. 2 is a detail of a portion of the apparatus shown in Fig. 1. Figures 3, 4 and 5 are views similar to Fig. 1 showing modifications of the apparatus. Figs. 6 and 7 are details of the apparatus shown in Fig. 5.

The machine is supported upon a table 10 which may be mounted in any desired manner. A bracket 11 projecting upward from the table may support operating mechanism not shown. A sleeve 12 is mounted in any suitable manner for vertical reciprocation. A shaft 13 with the sleeve 12 is raised and lowered with the sleeve, but is rotated within the sleeve by any suitable means, not shown. The shaft carries at its lower end a chuck 14, adapted to hold an article A with its moil B downward. The sleeve shaft and chuck may be raised and lower by a link 15, carried on the end of a rock arm 16 which extends from a rock shaft 17 journaled in the bracket 11. The rock shaft 17 is shown carrying another arm 18, having a friction wheel 19 adapted to contact an operating cam, not shown.

At the front of the table 10, there is a casting 22 having two ears 23, within which are mounted vertical rods 24. A supporting bracket 25 is mounted for vertical adjustment upon the rods 24, by means of ears 26. A burner 27 is mounted upon a burner carrier 28. The burner carrier has a tubular portion 29 mounted for vertical reciprocation within the bracket 25. A longitudinal groove 30 within the tubular portion 29 is adapted to receive the end of a screw 31 through the wall of the bracket 25, to prevent turning of the tubular part within the bracket.

A toggle link 32 is pivoted to a vertically movable slide 33 in the bracket 25, and at its upper end is pivoted at 34 to a toggle link 35, which in turn is pivoted at 36 to the burner carrier 28. A trigger 37 is pivoted at 38 to the burner carrier 28, so that it will project beneath the burner, and its other end is pivoted at 39 to a link 40. The link 40 is connected at its other end 41 to an offset portion of the toggle link 35. A screw 42 forms a vertically adjustable abutment upon which the lower end of the slide 33 rests. A bracket 43 is attached to the bracket 25, and is grooved on its side next to bracket 25 to provide a guideway for the slide 33. A lever 44 is fulcrumed at 45 on the bracket 43. An arm 46 fixed to the lever 44 carries a striking member 47 adapted at times to strike the toggle link 32. A guide rod 48 is mounted within the carrier 28 and has pivoted thereto at 49 a link 50, the other end of the link 50 being pivoted at 51 to an end of the lever 44. The other end of the lever 44 is pivoted at 52 to a link 53, suspended from a pivot 54 on the rock arm 16. The link 53 is adjustable by being made in two parts, with the slot 55 in one part receiving lock bolts 56 fixed in the other part.

A burner 57 is mounted in position to play upon the chuck when the chuck is in lowered position. A burner controlling valve 58 carries an operating arm 59, which is operated by lugs 60 and 61 upon the link 53.

In the form of apparatus shown in Fig. 3, the carrier 28 is cut off at 65 and the burner carrying bracket 66 is mounted directly upon the table 10. As shown, this bracket 66 has a horizontal lug 67 adapted to overlie the table 10, and a vertical lug 68 adapted to contact the side of the table. The bracket may be adjusted vertically by means of a set screw 69, passing through the lug 67 and bearing upon the top of the table, while a slot 70 in the lug 68 receives a set screw 71 for fixing the bracket in adjusted position. Rod supporting ears 23$^a$ depend from the bracket 66.

A lever 72 is fulcrumed upon a lug 73, depending from the table 10. One end of the lever 72 is pivoted at 74 to the carrier 28, while the other end of the lever is pivoted at 75 to a push rod 76. The push rod 76 is guided by a bracket 77 fixed to the bracket 11. A set screw 78 at the upper end of the push rod 76 is held in position to contact an abutment 79 on the rock arm 16.

In the construction shown in Fig. 4, the carrier 28 is cut off at 65 in the same manner as shown in Fig. 3. In this form, the burner is supported by a stationary bracket 80 having depending rod supporting ears 23$^b$. The link 15$^a$ is made in two sections relatively adjustable by means of a slot 81. Fuel is supplied to the burner through pipes 82 and 83. Pipe 83 is shown extending from a valve 84. A lever 85 is pivoted at 86 upon a bracket 87, extending downwardly from the table 10. One end of the lever 85 is pivoted at 88 to the carrier 28, while the other end of the lever is in position to contact the stem 89 of the valve 84.

In the form shown in Fig. 5, a stationary bracket 90 supports a burner 91 formed of segments 92. Bracket 90 has depending rod supporting ears 23$^c$. The segments 92 are slidably mounted upon the bracket plate 93, and are guided for radial movement upon the plate by lugs 94, which fit within dovetailed grooves 95 in the plate 93. The burner segments are supplied with fuel through pipes 96, from which project pins 97. Bell crank levers 98 are pivoted at 99 to lugs 100, extending from the plate 93. The upper ends of levers 98 are pivoted to the pins 97, while their lower ends are connected at 101 to links 102 extending from pivots 103 on the carrier 28. L-shaped lugs 104 extend from the plate 93 and carry set screws 105 adapted to limit the outward movement of the segments. Springs 106 surround the set screws 105 and tend to press the segments 92 together.

The operation of my apparatus is as follows:

When the chuck 14 is raised, an article of glassware, such as a blown tumbler from which the moil is to be removed, is placed within the chuck. The mechanism for rotating the chuck is preferably rendered inoperative when the chuck is raised, so that the chuck will not rotate at the time the article is placed therein, but will commence rotation when it is lowered to position the article within the burner. When the sleeve 12 and chuck 14 are lowered to position the article within the burner, the guide rod 48 is raised, by means of its connection to the arm 16, until the upper end of the guide rod is positioned within the moil. Other parts will be in the position shown in Figure 1. If the glass is slightly thinner at one side than it is at the other side, severance may take place on the thin side before it is completed on the thicker side, and the guide rod prevents the moil from swinging to one side and placing undue strain on the portion of the glass not yet severed.

When severance is complete and the moil drops, it strikes trigger 37 and through the link 40 swings the pivot 34 to the right, as viewed in Fig. 1, and thereby breaks the toggle connection between the slide 33 and the carrier 28 and allows the carrier to drop upon the bracket 25. This dropping of the carrier lowers the burner a slight distance below the severed edge of the tumbler and the continued action of the flame at this lowered position properly fire-finishes the severed edge.

After this fire-finishing operation has been continued for a sufficient time, the arm 16 is rocked to raise the chuck 14. This lowers the guide rod 48 and allows the moil to slip off from the trip and carrier. At the same time, the swinging of lever 44 carries the strike member 47 against link 32 and returns links 32, 35 and 40 and the carrier 28 and trip 37 to the position in which they are shown in Fig. 1.

When articles of a different length are to be severed, the distance of the burner from the chuck may be adjusted by moving the bracket 25 vertically upon the rods 24. The distance that the burner drops may be adjusted by raising or lowering the slide 33, by means of set screw 44. The chuck 14 may be of any desired construction, but I prefer to use a vacuum chuck, which will center the articles correctly.

When the articles are hot, as they should be at the time they are introduced into the chuck 14, the chuck must be heated or else the glass contacting portions must be of material that is a poor conductor of heat. I prefer to heat the chuck, and also to make a plate which contacts the bottom of the article of non-conducting material.

A burner 57 is shown for this purpose and is also positioned so that a portion of its flame may play upon the article between the chuck and the burning-off flame. This burner 57 is controlled by its valve 58 so that there is only a pilot light burning when the chuck is raised and the full flame is automatically turned on when the chuck is lowered into position to receive the flame.

When a vacuum chuck is used, it is practically impossible to prevent some leakage of air which tends to produce a draft around the article, and therefore it is especially advantageous when a vacuum chuck is used, to play a flame upon the chuck and in position to be drawn up about the article by such draft, and thereby prevent injurious chilling of the article.

The apparatus shown in Fig. 3 operates in precisely the same manner as that shown in Fig. 1, except that the lowering of the carrier 28 causes the raising of the chuck instead of the lowering of the burner. As will be readily seen, when the trip is operated to break the toggle and lower the carrier 28, lever 72 is rocked to raise the push rod 76, rock arm 16, link 15 and chuck 14. It will be readily apparent that raising the chuck with the article therein has precisely the same effect in separating the flame from the burned-off edge that lowering the burner has.

In the form of apparatus shown in Fig. 4, the burner is supplied through two pipes, one of which is controlled by the valve 84. The purpose of this structure is to reduce the intensity of the flame after the moil drops. It is obvious that the valve might be operated in various ways to effect this purpose, but the operation which I prefer is to feed fuel gases constantly through pipe 82 and to feed oxygen through pipe 83 intermittently. During the burning-off operation, oxygen is fed through the pipe 83 and renders the heat of the flame intense, but when the moil drops upon the trigger and the carrier 28 is lowered, the lever 85 is moved against the valve stem 89 and shuts off the supply of oxygen so that the continuing flame is milder and will act as a fire-finishing flame.

In the form of device shown in Fig. 4, the bracket 80 remains in fixed position and any adjustment necessary for different length articles is taken care of by means of the adjustable link 15ª.

In the form of apparatus shown in Fig. 5, the dropping of the carrier 28 transmits motion through links 102 and levers 101 to the segments 92 to draw them apart and space them from the article. During the severing step, the segments are pressed together by springs 106 and form a continuous annular flame with the hottest point of the flame contacting the wall of the article, but when the moil drops, the segments are moved outward radially until they abut the set screws 105 and thereby the hottest point of the flame is moved away from the article and in that way the burner is rendered suitable for fire-finishing.

While I have shown several ways in which the severing flame may be rendered suitable for fire-finishing purposes, it is to be understood that I have not attempted to describe all of the various ways in which this might be done, and while I have shown and described specific mechanism for automatically causing the change in the application of heat upon the completion of severance, obvious changes may be made in this mechanism, and therefore I do not wish to limit my invention to the structure disclosed further than is indicated by the appended claims.

What I claim is:

1. In an apparatus for severing glass, a melting-off burner, a holder adapted to hold a glass article with its point of desired severance exposed to a flame from the burner, and automatic means operable upon the completion of a severance to increase the distance between the burner and holder and means to stop said increase at a fraction of an inch.

2. In an apparatus for severing glass, a burner, a holder adapted to hold a glass article with its point of desired severance exposed to a flame from the burner, and automatic means, dependent for its operation upon the completion of a severance, for increasing the distance between the holder and burner.

3. In an apparatus for severing glass and fire-finishing the severed edge, a fire-finishing burner, and means, dependent for its operation upon the completion of a severance, for initiating the fire-finishing action of the burner.

4. In an apparatus for severing glass and fire-finishing the severed edge, an edge-finishing device, and means, dependent for its operation upon the completion of a severance, for initiating the edge-finishing action of the device.

5. In an apparatus for removing the moil from blown glass articles, a holder adapted to hold such an article with the moil down, means to sever off the moil, and a trip in the path of the severed moil and adapted to initiate the next operation of the apparatus.

6. In apparatus for severing glass, a burner, a trip member beneath the burner, and mechanism by which the depression of the trip member results in the lowering of the burner.

7. In apparatus for severing glass, a burner, a holder adapted to suspend a glass article with its point of desired severance exposed to a flame from the burner, and means operable by the dropping of a severed off portion of the glass to lower the burner with respect to the holder.

8. In apparatus for severing glass, a burner, a holder adapted to suspend a glass article with its point of desired severance exposed to a flame from the burner, means to rotate the holder about a vertical axis, and means operable by the dropping of a severed off portion of the glass to lower the burner with respect to the holder.

9. In apparatus for severing glass, a burner, a holder adapted to suspend a glass article with its point of desired severance exposed to a flame from the burner, means to heat the holder, and means operable by the dropping of a severed off portion of the glass to lower the burner with respect to the holder.

10. In apparatus for severing glass, a burner, a holder adapted to suspend a glass article with its point of desired severance exposed to a flame from the burner, a trip, means to guide to the trip glass severed from the suspended article, and means set in operation by the trip to lower the burner with respect to the holder.

11. In apparatus for severing glass, a burner, a holder adapted to suspend a glass article with its point of desired severance exposed to a flame from the burner, means to increase the vertical distance between the burner and holder, and a trip for operating said means, said trip being positioned in the path of glass dropping from an article in the holder.

12. In apparatus for severing glass, a vertically movable burner, a holder adapted to suspend a glass article with its point of desired severance exposed to a flame from the burner when the burner is raised, a device to hold the burner in raised position, and means operable by the completion of a severance to release said device and allow the burner to be lowered.

13. In apparatus for severing glass, a vertically movable burner, a holder adapted to suspend a glass article with its point of desired severance exposed to a flame from the burner when the burner is raised, a device to hold the burner in raised position, and means operable upon the completion of a severance to release said device and allow the burner to be lowered, and an adjustable stop for limiting the lowering of the burner.

14. In apparatus for severing glass, a vertically movable burner, a holder adapted to suspend a glass article with its point of desired severance exposed to a flame from the burner when the burner is raised, a toggle for supporting said burner in its raised position, and a trip operable by the dropping of a severed portion of glass to break said toggle.

15. In apparatus for severing glass, a vertically movable burner, a holder adapted to suspend a glass article with its point of desired severance exposed to a flame from the burner when the burner is raised, a toggle for supporting said burner in its raised position, a trip operable by the dropping of a severed portion of glass to break said toggle, and an adjustable stop for limiting the lowering of the burner.

16. In apparatus for severing glass, a melting-off burner, a vacuum chuck adapted to suspend a glass article with its point of desired severance exposed to a flame from the burner, means to heat said chuck, and a device for lowering the burner in respect to the chuck, the operation of said device being dependent upon the completion of a severance.

17. In apparatus for severing hollow glassware, a melting-off burner, a vertically reciprocable chuck above said burner, a vertically reciprocable rod below said burner, and connected means for simultaneously reciprocating the chuck and rod in opposite directions.

18. In apparatus for severing glass, a melting-off burner, a chuck above said burner, means to lower and raise said burner, means operable by the dropping of a severed off portion of glass for lowering said burner, and means connected to the chuck raising means for raising said burner.

19. In apparatus for severing hollow glassware, an annular melting-off burner, a chuck above said burner, means to raise and lower said chuck, a chuck heating burner in position to heat said chuck at one position in its travel, and a valve operated by the chuck raising and lowering means and controlling the supply of fuel to the chuck heating burner.

20. In apparatus for severing hollow glassware, an annular melting-off burner, a vacuum chuck above said burner, means to raise and lower said chuck, a chuck heating burner in position to heat said chuck at one position in its travel, and a valve operated by the chuck raising and lowering means and controlling the supply of fuel to the chuck heating burner.

21. In apparatus for severing glass, a holder for suspending a glass article, a melting-off burner beneath said holder, a vertically adjustable bracket on which said burner is mounted for vertical reciprocation, and means operable by the dropping of a severed off portion of glass to lower the burner with respect to the bracket.

22. In apparatus for severing glass, a holder for suspending a glass article, a melting-off burner beneath said holder, a vertically adjustable bracket on which said burner is mounted for vertical reciprocation, and means carried by said bracket for raising and lowering said burner, the burner lowering means including a trip operable by the dropping of a severed off portion of glass.

23. In apparatus for severing glass, a chuck, means to reciprocate the chuck vertically, a melting-off burner, a bracket on which the burner is mounted for vertical reciprocation, and means carried by the bracket for raising and lowering the burner, the burner lowering means being operable by the dropping of a severed off portion of glass, and the burner raising means being operatively connected to the chuck raising means.

24. In apparatus for severing glass, a chuck, means to reciprocate the chuck vertically, a melting-off burner, a carrier for the burner, a vertically adjustable bracket upon which the carrier is mounted for vertical reciprocation, a guide rod vertically reciprocable in the carrier, a toggle connected to the carrier and bracket and adapted, when straightened, to raise the carrier, a trip beneath the burner adapted, when depressed, to break the toggle, a lever mounted upon the bracket and adapted to reciprocate the guide rod and straighten the toggle, and an adjustable link connecting the lever and chuck reciprocating means.

In testimony whereof, I have hereunto subscribed my name to this specification.

ALVAH C. PARKER.